(12) United States Patent
Pihl et al.

(10) Patent No.: US 11,716,475 B2
(45) Date of Patent: Aug. 1, 2023

(54) IMAGE PROCESSING DEVICE AND METHOD OF PRE-PROCESSING IMAGES OF A VIDEO STREAM BEFORE ENCODING

(71) Applicant: Axis AB, Lund (SE)

(72) Inventors: Fredrik Pihl, Lund (SE); Mattias Pettersson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/499,887

(22) Filed: Oct. 13, 2021

(65) Prior Publication Data
US 2022/0124339 A1   Apr. 21, 2022

(30) Foreign Application Priority Data
Oct. 21, 2020   (EP) ..................... 20202951

(51) Int. Cl.
*H04N 19/132* (2014.01)
*H04N 19/146* (2014.01)
*H04N 19/172* (2014.01)
*H04N 19/59* (2014.01)

(52) U.S. Cl.
CPC ......... *H04N 19/132* (2014.11); *H04N 19/146* (2014.11); *H04N 19/172* (2014.11); *H04N 19/59* (2014.11)

(58) Field of Classification Search
None
See application file for complete search history.

(56) References Cited

U.S. PATENT DOCUMENTS

| | | | |
|---|---|---|---|
| 9,036,707 B2 * | 5/2015 | Guduru | H04N 19/53 375/E7.076 |
| 2012/0033040 A1 | 2/2012 | Pahalawatta et al. | |
| 2012/0275511 A1 * | 11/2012 | Shemer | H04N 19/14 375/E7.126 |
| 2013/0156113 A1 | 6/2013 | Ismael-Mia et al. | |
| 2014/0169700 A1 * | 6/2014 | Liu | G06T 5/50 382/294 |
| 2016/0360231 A1 | 12/2016 | Yuan et al. | |
| 2018/0103230 A1 | 4/2018 | Vitta et al. | |

FOREIGN PATENT DOCUMENTS

| | | |
|---|---|---|
| EP | 2723079 A2 | 4/2014 |
| WO | 2008/011502 A2 | 1/2008 |
| WO | 2008/011502 A3 | 4/2008 |

* cited by examiner

*Primary Examiner* — Stuart D Bennett
(74) *Attorney, Agent, or Firm* — Xsensus LLP (57) ABSTRACT

An image processing device 300, a non-transitory computer readable storage medium, a monitoring camera 200 and a method 100 of pre-processing images of a video stream before encoding the video stream are disclosed. The images are obtained S110, wherein the obtained images have a first resolution. The obtained images are subsampled S120 to intermediate images having a second resolution lower than the first resolution and lower than a third resolution. The intermediate images are upsampled S130 to output images having the third resolution, wherein the third resolution is the same for all images of the video stream.

15 Claims, 4 Drawing Sheets

IMAGE PROCESSING DEVICE AND METHOD OF PRE-PROCESSING IMAGES OF A VIDEO STREAM BEFORE ENCODING

CROSS-REFERENCE TO RELATED APPLICATION

This application claims priority from European Patent Application No. 20202951.8, filed on Oct. 21, 2020, the contents of which are incorporated by reference herein in its entirety.

TECHNICAL FIELD

The present invention relates to processing of images, and specifically to pre-processing images of a video stream before encoding the video stream.

BACKGROUND

For cameras that are used for monitoring or surveillance, the bitrate of an encoded video stream may be a limiting factor, e.g. when the encoded video stream is to be transmitted and/or stored. At the same time, the encoded video stream may need to be used as forensic information and therefore as much details as possible should be maintained in the encoded video. For situations where high frequency components, such as noise, occur in images of the video stream to be encoded, the bitrate of the encoded video stream will increase. To reduce the bitrate, high frequency components of the video stream to be encoded may be removed or reduced by means of a blurring or smoothing filter, such as a low pass filter. However, some of the high frequency components filtered out and may include information of interest.

SUMMARY OF THE INVENTION

An object of the present invention is to facilitate bitrate savings when encoding a video stream.

According to a first aspect, a method of pre-processing images of a video stream before encoding the video stream is provided. In the method, the images are obtained, wherein the obtained images have a first resolution. The obtained images are subsampled to intermediate images having a second resolution lower than the first resolution and lower than a third resolution. The intermediate images are upsampled to output images having the third resolution, wherein the third resolution is the same for all images of the video stream.

By images of the video stream and obtained images is meant a set of images of the video stream which may be all images of the video stream or a subset of images. In case of a subset of images, the subset of images may be a sequence of consecutive images in the video stream or it may be images spread out in the video stream with intermediate images not part of the subset.

By first subsampling the obtained images to intermediate images and then upsampling the intermediate images to the output images, a reduction of resolution followed by an increase of resolution is achieved, and the information density in the output images is reduced in relation to the information density in the obtained images. In the output images, some high-frequency components, such as those resulting from noise, in the obtained images are reduced, whilst other including forensic information remain to a larger extent. Hence, the bitrate resulting from a subsequent encoding of the output images will be reduced in relation to encoding the obtained images without intermediate subsampling and upsampling. At the same time, some high-frequency components including forensic information remain to a larger extent. Forensic information may for example be information that enables object recognition and event detection.

Furthermore, since the third resolution is the same for all images of the video stream, the method will output images having the same third resolution. This is advantageous since it may then be used in relation to encoders which do not support dynamic resolution or for which dynamic resolution is not suitable for other reasons.

The third resolution may be a resolution required by an encoder to be used for encoding the video stream. The third resolution may thus be a predetermined resolution that is applied in encoding of all images in the video stream, i.e. both images which the present invention is applied to and other images of the video stream.

The subsampling may comprise applying a subsampling algorithm, and the upsampling may comprise applying an upsampling algorithm configured to increase correlation between pixels of the output images in relation to the correlation between pixels of the obtained images. By increasing the correlation between pixels in the output images in relation to the correlation between pixels in the obtained images, the bitrate of the output images as encoded will be lower than the bitrate of the obtained images as encoded would have been. This is because when encoding an image, the correlation between pixels may be used in order to reduce the number of bits needed to encode the image.

The upsampling algorithm may be based on interpolation between the pixels of the intermediate images. Using an upsampling algorithm based on interpolation will increase correlation between pixels of the output images in relation to the correlation between pixels of the obtained images. This is due to the way the increased resolution is achieved when interpolation is used in the upsampling algorithm. The subsampling algorithm may also be based on interpolation between the pixels of the obtained images.

The interpolation on which the upsampling algorithm is based, may be one of bilinear interpolation, area interpolation, bicublin interpolation, bicubic interpolation, spline interpolation, lanczos interpolation, and sinc interpolation. Furthermore, the interpolation on which the subsampling algorithm is based, may be one of bilinear interpolation, area interpolation, bicublin interpolation, bicubic interpolation, spline interpolation, lanczos interpolation, and sinc interpolation. The same or different types of interpolation may be used in the subsampling algorithm and the upsampling algorithm.

The method may further comprise determining a characteristic of the video stream and determining the second resolution based on the determined characteristic of the video stream. The characteristic may be a characteristic that is known to affect the bitrate of the video stream as encoded. Furthermore, it is generally the case that the lower the second resolution, the more the bitrate is reduced. Thus, the method may be adaptive to changes in the characteristic. If the characteristic changes to indicate a higher bitrate of the video stream as encoded, the second resolution may be determined to a lower resolution accordingly.

The characteristic of the video stream may be one of a motion level, a light level, a noise level, and a bitrate.

According to a second aspect, a method of encoding images of a video stream is provided. The images are first pre-processed according to the method of the first aspect the output images and then encoded by an encoder.

The upsampling may comprise partitioning pixels of the output images into a predetermined block size, wherein the predetermined block size is determined based on a block size supported by the encoder.

According to a third aspect, a non-transitory computer readable storage medium is provided. The non-transitory computer readable storage medium has stored thereon instructions for implementing the method according to the first aspect or the method according to the second aspect, when executed on a device having processing capabilities.

According to a fourth aspect, an image processing device is provided. The image processing device comprises circuitry configured to execute an image obtaining function, a subsampling function, an upsampling function, and an output function. The image obtaining function is configured to obtain images of a video stream before encoding the video stream, wherein the obtained images have a first resolution. The subsampling function is configured to subsample the obtained images to intermediate images having a second resolution lower than the first resolution and lower than a third resolution. The upsampling function is configured to upsample the intermediate images to output images having the third resolution, wherein the third resolution is the same for all images of the video stream. The output function is configured to output the output images to an encoder configured to encode the output images into an encoded video stream.

The third resolution may be a resolution required by the encoder.

The subsampling function may further be configured to apply a subsampling algorithm, and the upsampling function may further be configured to apply an upsampling algorithm configured to increase correlation between pixels of the output images in relation to the correlation between pixels of the obtained images.

The subsampling algorithm may be based on interpolation between the pixels of the obtained images, and the upsampling algorithm may be based on interpolation between the pixels of the intermediate images.

The interpolation on which the subsampling algorithm is based, may be one of bilinear interpolation, area interpolation, bicublin interpolation, bicubic interpolation, spline interpolation, lanczos interpolation, and sinc interpolation. Furthermore, the interpolation on which the upsampling algorithm is based, may be one of bilinear interpolation, area interpolation, bicublin interpolation, bicubic interpolation, spline interpolation, lanczos interpolation, and sinc interpolation.

The circuitry may be further configured to execute a characteristic determining function and a second resolution determining function. The characteristic determining function is configured to determine a characteristic of the video stream. The second resolution determining function is configured to determine the second resolution based on the determined characteristic of the video stream.

The characteristic of the video stream may be one of a motion level, a light level, a noise level, and a bitrate.

According to a fifth aspect, an image encoding device is provided. The image encoding device comprises the image processing device according to the fourth aspect and an encoder configured to encode the output images into an encoded video stream.

The upsampling function may be further configured to partition pixels of the output images into a predetermined block size, wherein the predetermined block size is determined based on a block size supported by the encoder.

According to a sixth aspect, a monitoring camera is provided. The monitoring camera comprises the image processing device according to the fourth aspect or the image encoding device according to the fifth aspect.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein. Rather, these embodiments are provided for thoroughness and completeness, and to convey the scope of the invention to the skilled person.

Figure 1:
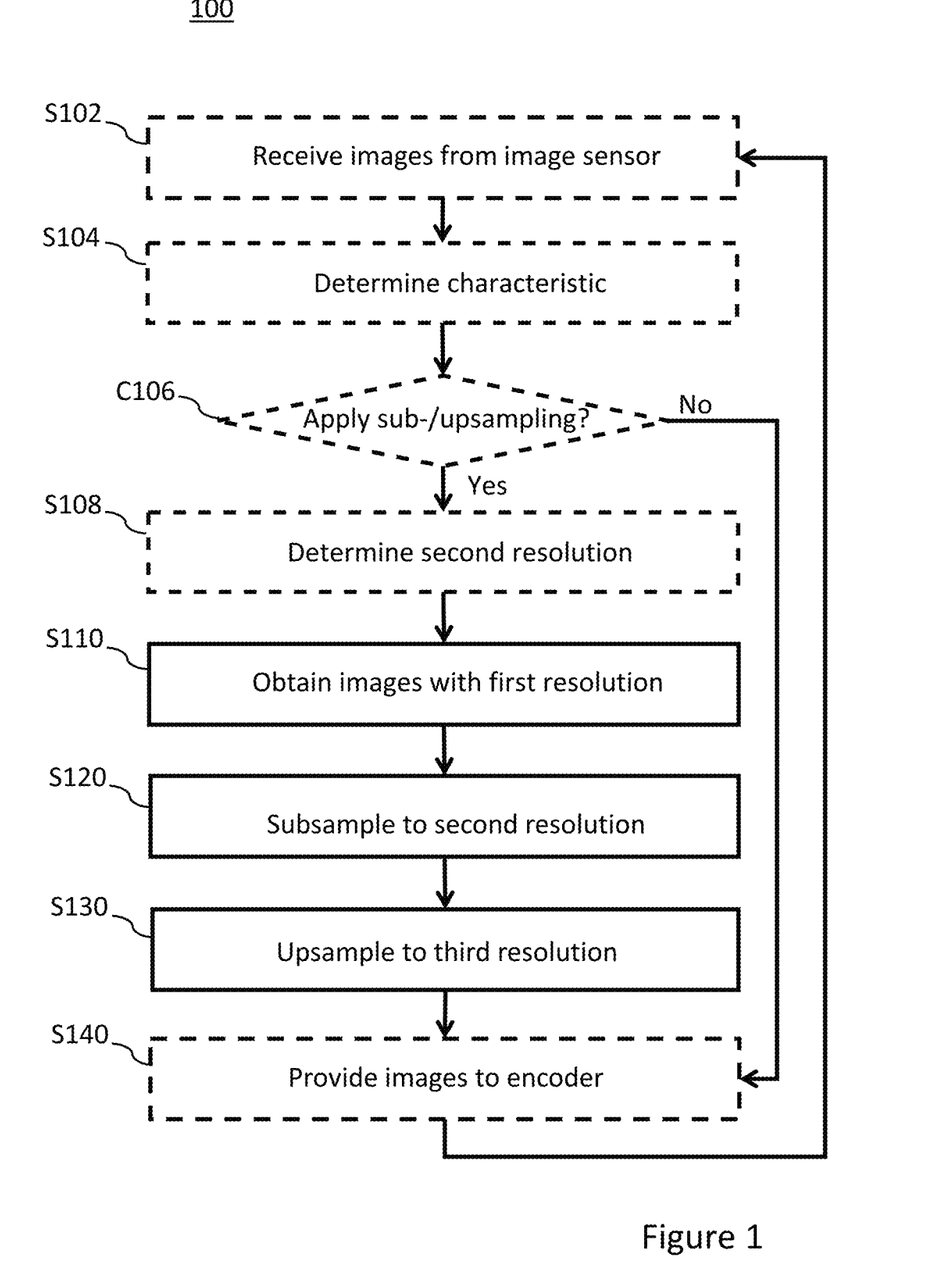
FIG. 1 is a flow chart of embodiments of a method for pre-processing images of a video stream before encoding the video stream.

FIG. 1 is a flow chart of embodiments of a method 100 for pre-processing images of a video stream before encoding the video stream. In the method 100 according to one of the embodiments, the images are first obtained S110. The obtained images have a first resolution. The obtained images are then subsampled S120 to intermediate images. The intermediate images have a second resolution. The second resolution is lower than the first resolution and lower than a third resolution. The intermediate images are upsampled S130 into output images. The output images have the third resolution. The third resolution is the same for all images of the video stream, i.e. the third resolution is constant over the video stream.

By first subsampling the obtained images to intermediate images and then upsampling the intermediate images to the output images, a reduction of resolution followed by an increase of resolution is achieved, and the information density in the output images is reduced in relation to the information density in the obtained images. In the output images, some high frequency components, such as those resulting from noise, in the obtained images are reduced, whilst other of forensic interest remain to a larger extent. Hence, the bitrate resulting from a subsequent encoding of the output images will be reduced in relation to encoding the obtained images without intermediate subsampling and upsampling.

Furthermore, since the third resolution is the same for all images of the video stream, the method will output images having the same third resolution. This is advantageous since it may then be used in relation to encoders which do not support dynamic resolution or for which dynamic resolution is not suitable for other reasons. The third resolution may then be set to a resolution required by an encoder to be used for encoding the video stream. The third resolution may also be designated as the final resolution, since this is the resolution which the output images finally produced by the method will have. Similarly, the first resolution may be designated as the initial resolution and the second resolution may be designated the intermediate resolution.

The subsampling may comprise applying a subsampling algorithm, and the upsampling may comprise applying an upsampling algorithm. Specifically, the upsampling algorithm may be configured to increase correlation between pixels of the output images in relation to the correlation between pixels of the obtained images. One way of increasing the correlation between pixels of the output images in relation to the correlation between pixels of the obtained images is to use an upsampling algorithm based on interpolation between the pixels of the intermediate images. The subsampling algorithm may also be based on interpolation between the pixels of the obtained images.

The subsampling algorithm and the upsampling algorithm may for example use the same or a different one of bilinear interpolation, area interpolation, bicublin interpolation, bicubic interpolation, spline interpolation, lanczos interpolation, and sinc interpolation in order of preference. The subsampling algorithm and the upsampling algorithm using the same or a different one of bilinear interpolation and area interpolation is preferred. Most preferred is using bilinear interpolation for both the subsampling algorithm and the upsampling algorithm.

The method 100 may comprise further steps of determining S104 a characteristic of the video stream and determining S108 the second resolution based on the determined characteristic. The characteristic may be a characteristic that is known to affect the bitrate of an encoded version of the video stream. For example, the characteristic may be one of a motion level, a light level and a noise level. An increasing motion level, a decreasing light level, and/or an increasing noise level in the video stream, will cause an increasing bitrate for the video stream as encoded. Specifically, decreasing light level, will result in increasing noise level which in turn will cause an increasing bitrate for the video stream as encoded.

The motion level, light level and noise level of the video stream may be determined by means of image analysis. The motion level, light level and noise level of the video stream are direct characteristics of the video stream which provide indirect measures of the bitrate of the video stream as encoded. The characteristic of the video stream may also be the bitrate directly, i.e. the bitrate of the video stream as encoded. The bitrate may be determined from the video stream as encoded and the second resolution is then determined based on the bitrate. The bitrate is an indirect characteristic of the video stream in that it is a characteristic of the video stream as encoded rather than a characteristic of the video stream itself. Hence, an indirect characteristic of the video stream is determined in the form of a direct measure of the bitrate of the video stream as encoded.

The second resolution may further be dynamically determined based on the determined characteristic. For example, the characteristic may be determined periodically at predetermined intervals and if the characteristic has changed since a previous determining, the second resolution will be changed accordingly. Hence, the characteristic is determined S104 at the beginning of a first interval and the second resolution is determined S108 for the first interval based on the characteristic determined at the beginning of the first interval. The images are obtained S110 during the first interval and the obtained images are subsampled S120 to intermediate images having the second resolution determined for the first interval. The intermediate images are then upsampled S130 to output images having the third resolution. The output images may then be provided S140 to an encoder. The characteristic is then determined S104 again at the beginning of a second interval and the second resolution is determined S108 for the second interval based on the characteristic determined at the beginning of the second interval. Further images are then obtained S110 during the second interval and the obtained further images are subsampled S120 to further intermediate images having the second resolution determined for the second interval. The further intermediate images are then upsampled S130 to further output images having the third resolution. The further output images may then be provided S140 to the encoder. It is to be noted that the second resolution may be different in different intervals whereas the third resolution will be the same for all intervals.

The reduction of bitrate achieved by the subsampling and upsampling will for instance depend on the second resolution. Generally, the lower the second resolution, the more the bitrate is reduced. Hence, the higher bitrate the determined characteristic indicates, the lower the second resolution should be.

The characteristic of the video stream may be determined S104 based on different images of the video stream. For example, the characteristic may be determined for the obtained images. This is advantageous since the second resolution is then determined based on a characteristic of the obtained images which are to be subsampled to the second resolution. In alternative, the characteristic may be determined for images preceding the obtained images in the video stream. This may be advantageous if delays should be avoided. Even if the characteristic is then not determined for the obtained images directly, many characteristics such as motion level, light level and noise level are likely to be similar for the obtained images and images preceding the obtained images in the video stream, especially if the characteristic is determined for images immediately before the obtained images in the video stream. Furthermore, if the characteristic is the bitrate, the bitrate of the video stream as encoded must be determined for images preceding the obtained images in the video stream since the subsampling to the second resolution of the obtained images is performed before the encoding.

Furthermore, determining S104 the characteristic of the video stream may include determining a trend over time of the characteristic and then determine S108 the second resolution based on the trend. For example, in addition to the value of the characteristic, the first and second derivate for recent historic values of the characteristic may be taken into account.

The characteristic may also be determined by means of an external sensor, such as a light sensor or a motion sensor. For example, an external light sensor may measure light level in the scene captured by the images of the video stream. Decreasing light level in the scene, will result in increasing noise level in the images of the video stream. A motion sensor may measure motion of a camera capturing the images of the video stream. Increasing motion level of the camera, will result in increasing motion level in the images of the video stream.

The second resolution may further be determined S108 based on a bitrate requirement on the video stream as encoded. The bitrate requirement may further vary over time. If, for example, the encoded video stream should be transmitted via a wireless connection and the bandwidth available for transmission over the wireless connection is reduced during a period of time, a reduced second resolution may be determined for that period of time. This may be combined with determining a characteristic of the video stream such that the second resolution is determined based both on the determined characteristic and the bitrate requirement.

The pre-processing by subsampling S120 and upsampling S130 of images of a video stream before encoding may be dynamically applied for different images of the video stream as illustrated in FIG. 1. Images are first received S102 from an image sensor either directly or via other pre-processing functions. One or more criteria are then used to decide C106 whether or not to apply pre-processing by subsampling S120 and upsampling S130 of the received images. If the one or more criteria indicate that the pre-processing by subsampling S120 and upsampling S130 should not be applied, it is decided C106 that the pre-processing should not be applied and the received images are provided S140 directly to the encoder. If the one or more criteria indicate that the pre-processing by subsampling S120 and upsampling S130 should not be applied, it is decided C106 that the pre-processing by subsampling S120 and upsampling S130 should be applied and the method continues with obtaining S110 the images with the first resolution. A criterion may for example be whether or not one or more determined S104 characteristics indicate that reduction of bitrate for the received images after encoding is required. For example, the bitrate may be compared to an available bandwidth for transmission of the received images after encoding. If the bitrate is below the available bandwidth, it is decided C106 that the pre-processing by subsampling S120 and upsampling S130 should not be applied and the received images are provided S140 directly to the encoder. If the bitrate is above the available bandwidth, it is decided C106 that the pre-processing by subsampling S120 and upsampling S130 should be applied and the method continues with obtaining S110 the images with the first resolution.

Furthermore, determining S104 the characteristic of the video stream may include collecting statistics regarding partitioning of I-blocks and P-blocks and determining the proportion of I-blocks. If the proportion is higher than a threshold, it is determined C106 to apply pre-processing by subsampling S120 and upsampling S130 of the received images. If the proportion is lower than a threshold, it is determined C106 not to apply pre-processing by subsampling S120 and upsampling S130 of the received images. Additionally, or alternatively, the proportion can be used to set the second resolution. The higher the proportion, the lower the second resolution. The statistics may for example be collected by means of decoding the video stream using a decoder, provided in the encoder, and analysing the decoded video stream. The statistics is based on one or more frames of the decoded video stream.

Furthermore, determining S104 the characteristic of the video stream may include collecting statistics over time to identify recurring events which may be predicted to some extent. For example, recurring increase in used bandwidth during certain periods of time, e.g. due to recurring behaviour of groups of people such as during rush hours as identified over a week, may be used to predict times when bandwidth may be insufficient and reduction of bitrate for each transmission is desirable or even necessary. The statistics may be used to identify periods of time when the pre-processing by subsampling S120 and upsampling S130 is applied and when it is not. During periods for which it is predicted that bandwidth utilization will be low, it is determined C106 not to apply pre-processing by subsampling S120 and upsampling S130 of the received images. During periods for which it is predicted that bandwidth utilization will be high, it is determined C106 to apply pre-processing by subsampling S120 and upsampling S130 of the received images. Additionally, or alternatively, the statistics can be used to set the second resolution. The higher the predicted bandwidth utilization, the lower the second resolution.

The images received S102 from the image sensor have the first resolution. The first resolution may then be the same as the third resolution such that images provided S140 to the encoder without pre-processing by subsampling S120 and upsampling S130 will have the third resolution. Alternatively, if the first resolution is not the same as the third resolution, images provided S140 to the encoder without pre-processing by subsampling S120 and upsampling S130 will need to be resampled to have the third resolution.

The subsampling S120 and upsampling S130 of an image of the video stream may be uniform or it may be nonuniform. For example, the subsampling and upsampling of the image may be done only in horizontal direction or only in the vertical direction. The subsampling and upsampling may further be done only for some areas of the image, e.g. based on a determined characteristic, such as level of noise, level of light and level of motion. For example, the subsampling and upsampling may be applied only to certain areas of the image based on a determined level of noise, level of light, and/or level motion of the areas. As another example, the subsampling and upsampling may be applied only to certain areas of the based on presence of high frequency components in those areas.

The method as described in relation to FIG. 1 may be used in a method of encoding images of a video stream. The images are first pre-processed according to the method as described in relation to FIG. 1 and then encoded by an encoder.

The upsampling may comprise partitioning pixels of the output images into a predetermined block size, wherein the predetermined block size is determined based on a block size supported by the encoder. If the upsampling is adapted such that pixels within blocks of a block size supported by the encoder have similar values, this will increase efficiency of compression. If for example, the pixels within the blocks of the block size supported by the encoder have equal values only the DC-component is required to be encoded for each block which would in practice correspond to a compression by a factor proportional to the block size. Encoders may support one or more block sizes such as 64×64 pixels, 32×32 pixels, 16×16 pixels, 4×4 pixels etc.

This also has the effect of making the motion estimation more efficient. Measurements such as gain, signal-to-noise-ratio (SNR), bitrate, number of I-blocks etc. can be used to determine when to adaptively change the image fidelity.

Figure 2:
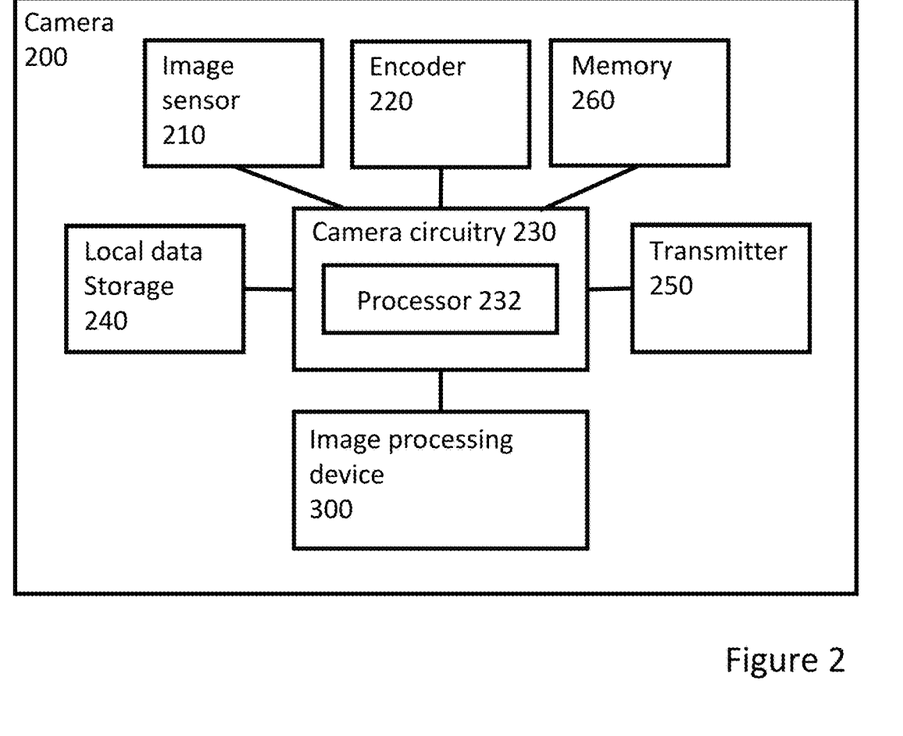
FIG. 2 is a schematic block diagram of a camera in which embodiments of an image processing device according to the present disclosure can be implemented.

FIG. 2 illustrates a camera 200 in which embodiments of an image processing device 300 according to the present disclosure can be implemented. The camera 200 may be a body worn camera, BWC, or another moveable camera or it may be a fixed camera, e.g. a monitoring camera or surveillance camera. The camera 200 may be a separate unit or it may be integrated in another unit, such as in a helmet, glasses etc. The camera 200 may be used, e.g., by police officers, for capturing video and possibly other data during patrols and incidents or it may be used for monitoring an area. Captured data may subsequently be needed as evidence, for example when investigating crimes and prosecuting persons suspected for the crimes. In order to preserve the captured data, a data management system external from the camera 200, such as a video management system or an evidence management system, may be used. Such data management systems generally provide storage of captured data, and also viewing of the captured data, either in real time or as a playback of recorded data. The camera 200 may be subject to bitrate limitations, e.g. due to limited data storage and/or limitations in bandwidth for a connection to the data management system or to a central where a live feed is viewed. Furthermore, the limitation in bandwidth for the connection may vary over time or between locations such that the bitrate occasionally becomes even more limited.

The camera 200 comprises an image sensor 210, an encoder 220, and camera circuitry 230. The image sensor 210 is configured to capture image data. The image data may, e.g., be data of image frames. Image sensors and capturing of image data are well known for the person skilled in the art and will not be discussed in any more detail in this disclosure.

The encoder 220 is configured to encode images captured by the image sensor 210 into a video stream, sometimes the video stream provided by the encoder 220 is referred to as an encoded video stream. Typically, the video encoder 220 is configured to encode some of the images of the video stream as intra frames or key frames and some of the images of the video stream as inter frames or delta frames. An intra frame is an encoded video frame that does not require information from other encoded video frames to be decoded. Hence, an intra frame is encoded based on information from the image frame of video data it is set to correspond to. Typically, similarities within the image frame are used to encode the image into an intra frame. In video encoding an intra frame is often referred to as an I-frame. The images of the video stream in between two intra frames are encoded as inter frames. Typically, an inter frame only comprises changes that occur from one frame to the next. Hence, inter frames are typically comprising less data than intra frames. In video encoding an inter frame is often referred to as a P-frame or a B-frame. P-frames refer to previous frames for data reference. Hence, the content of previous frames must be known in order to decode a P-frame. B-frames may refer to both previous and forward frames for data reference. Hence, the content of both the previous and forward frames must be known in order to decode a B-frame.

When encoding an image into an inter frame, the image is divided into multiple groups of pixels. The groups of pixels may for example be referred to as blocks, macroblocks, or coding tree units. The inter encoding is based on finding a matching group of pixels to refer to in a reference image. The group of pixels can then be encoded as a reference to the matching group of pixels. In other words, multiple intra encoding of pixel groups of the same kind is avoided. The reference includes a motion vector which specifies how the group of pixels has changed its spatial position compared to the same group of pixel in the reference image.

Determining motion vectors is sometimes referred to as motion estimation. If the difference in spatial position is large due to, e.g., fast movement of the camera or of objects in the captured scene, the motion estimation may fail in identifying motion vectors. The fewer motion vectors identified for an image frame to be encoded, the larger the resulting encoded inter frame will become in bit size and hence, the larger the contribution to the bitrate of the encoded video stream.

When images of a video stream include noise, such noise is typically random. Hence, a pixel or pixels in an image to be encoded, which pixel or pixels are corrupted by noise will likely have a value that differs substantially from neighbouring pixels. This will result in a larger bit size of an intra frame to be encoded since similarities within the image used to encode the image frame into an intra frame will be reduced due to the pixel or pixels are corrupted by noise. Furthermore, as the noise is typically random, the location of the noise in different images of the video stream will typically be different. Hence, the motion estimation for inter encoding may fail by that no matching group of pixels are found. The fewer matchings identified for an image frame to be encoded, the larger the resulting encoded inter frame will become in bit size and hence, the larger contribution to the bitrate of the encoded video stream.

The camera circuitry 230 is configured to carry out functions of the camera 200. The camera circuitry 230 may include a processor 232, such as a central processing unit (CPU), microcontroller, or microprocessor. The processor 232 is configured to execute program code. The program code may for example be configured to carry out the functions of the wearable camera 200.

The camera 200 may further comprise a local data storage 240. The local data storage 240 may be configured to store the video stream. The local data storage typically has a limited data storage capacity. The local data storage 240 may be any type of local data storage suitable for storage of a video stream. For example, the local data storage 240 may be in the form of an SD card reader and an SD card. Another example of a local data storage 240 may be in the form of a flash memory, e.g., a NAND flash.

The camera 200 may further comprise a transmitter 250. The transmitter 250 may be configured to transmit, e.g. wirelessly, the video stream to the data management system. The transmitter 250 may be configured to continuously transfer the captured video stream to the video management system. The transfer is typically limited due to bandwidth available for the transfer. The bandwidth available for transfer may also vary over time.

The camera 200 may further comprise a memory 260. The memory 260 may be one or more of a buffer, a flash memory, a hard drive, a removable media, a volatile memory, a non-volatile memory, a random access memory (RAM), or another suitable device. In a typical arrangement, the memory 260 may include a non-volatile memory for long term data storage and a volatile memory that functions as system memory for the camera circuitry 230. The memory 260 may exchange data with the camera circuitry 230 over a data bus. Accompanying control lines and an address bus between the memory 260 and the camera circuitry 230 also may be present.

Functions of the camera 200 may be embodied in the form of executable logic routines (e.g., lines of code, software programs, etc.) that are stored on a non-transitory computer readable medium (e.g., the memory 260) of the camera 200 and are executed by the camera circuitry 230 (e.g., using the processor 232). Furthermore, the functions of the camera 200 may be a stand-alone software application or form a part of a software application that carries out additional tasks related to the camera 200. The described functions may be considered a method that a processing unit, e.g. the processor 232 of the camera circuitry 230 is configured to carry out. Also, while the described functions may be implemented in software, such functionality may as well be carried out via dedicated hardware or firmware, or some combination of hardware, firmware and/or software.

Figure 3:
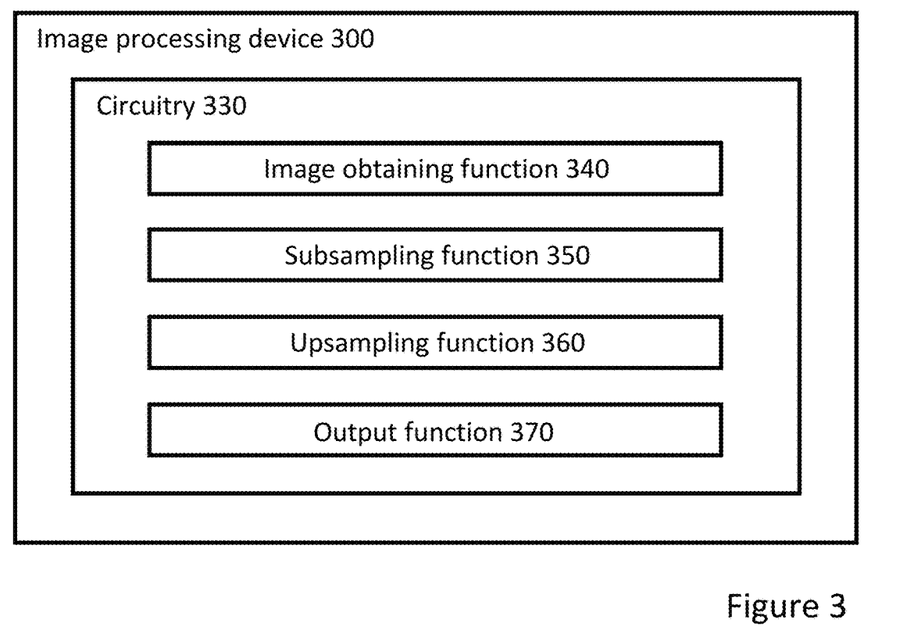
FIG. 3 is a schematic block diagram of a first embodiment of an image processing device according to the present disclosure.

FIG. 3 is a schematic block diagram of a first embodiment of an image processing device 300 according to the present disclosure. The image processing device 300 comprises circuitry configured to execute an image obtaining function 340, a subsampling function 350, an upsampling function 360, and an output function 370. The image obtaining function 340 is configured to obtain images of a video stream before encoding the video stream, wherein the obtained images have a first resolution. The subsampling function 350 is configured to subsample the obtained images to intermediate images having a second resolution lower than the first resolution and lower than a third resolution. The upsampling function 360 is configured to upsample the intermediate images to output images having the third resolution, wherein the third resolution is the same for all images of the video stream. The output function 370 is configured to output the output images to an encoder configured to encode the output images into an encoded video stream.

The subsampling function 350 may further be configured to apply a subsampling algorithm, and the upsampling function 360 may further be configured to apply an upsampling algorithm configured to increase correlation between pixels of the output images in relation to the correlation between pixels of the obtained images.

The subsampling algorithm may be based on interpolation between the pixels of the obtained images, and the upsampling algorithm may be based on interpolation between the pixels of the intermediate images.

The interpolation on which the subsampling algorithm is based, may for example be one of bilinear interpolation, area interpolation, bicublin interpolation, bicubic interpolation, spline interpolation, lanczos interpolation, and sinc interpolation. Furthermore, the interpolation on which the upsampling algorithm is based, may for example be one of bilinear interpolation, area interpolation, bicublin interpolation, bicubic interpolation, spline interpolation, lanczos interpolation, and sinc interpolation.

The circuitry 330 is configured to carry out the functions 340, 350, 360, 370 of the image processing device 300. The circuitry 330 may include a processor (not shown), such as a central processing unit (CPU), microcontroller, or microprocessor. Such a processor (not shown) may be configured to execute program code. The program code may for example be configured to carry out the functions 340-370 of the image processing device 300.

The functions 340, 350, 360, 370 of the image processing device 300 may be embodied in the form of executable logic routines (e.g., lines of code, software programs, etc.) that are stored on a non-transitory computer readable medium (not shown) of the image process device 300 and are executed by the circuitry 330, e.g., using a processor (not show) in the circuitry 330. Furthermore, the functions 340, 350, 360, 370 of the image processing device 300 may be a stand-alone software application or form a part of a software application. The described functions may be considered a method that a processing unit, e.g. the processor (not shown) of the circuitry 330 is configured to carry out. Also, while the described functions 340-370 may be implemented in software, such functionality may as well be carried out via dedicated hardware or firmware, or some combination of hardware, firmware and/or software.

When included in another device, such as a camera as shown in FIG. 2, the circuitry 330 of the image processing device 300 may be a separate circuitry or it may be included in the camera circuitry 230.

The functions carried out by the circuitry 330 may be further adapted as the corresponding steps of the method 100 described in relation to FIG. 1.

Figure 4:
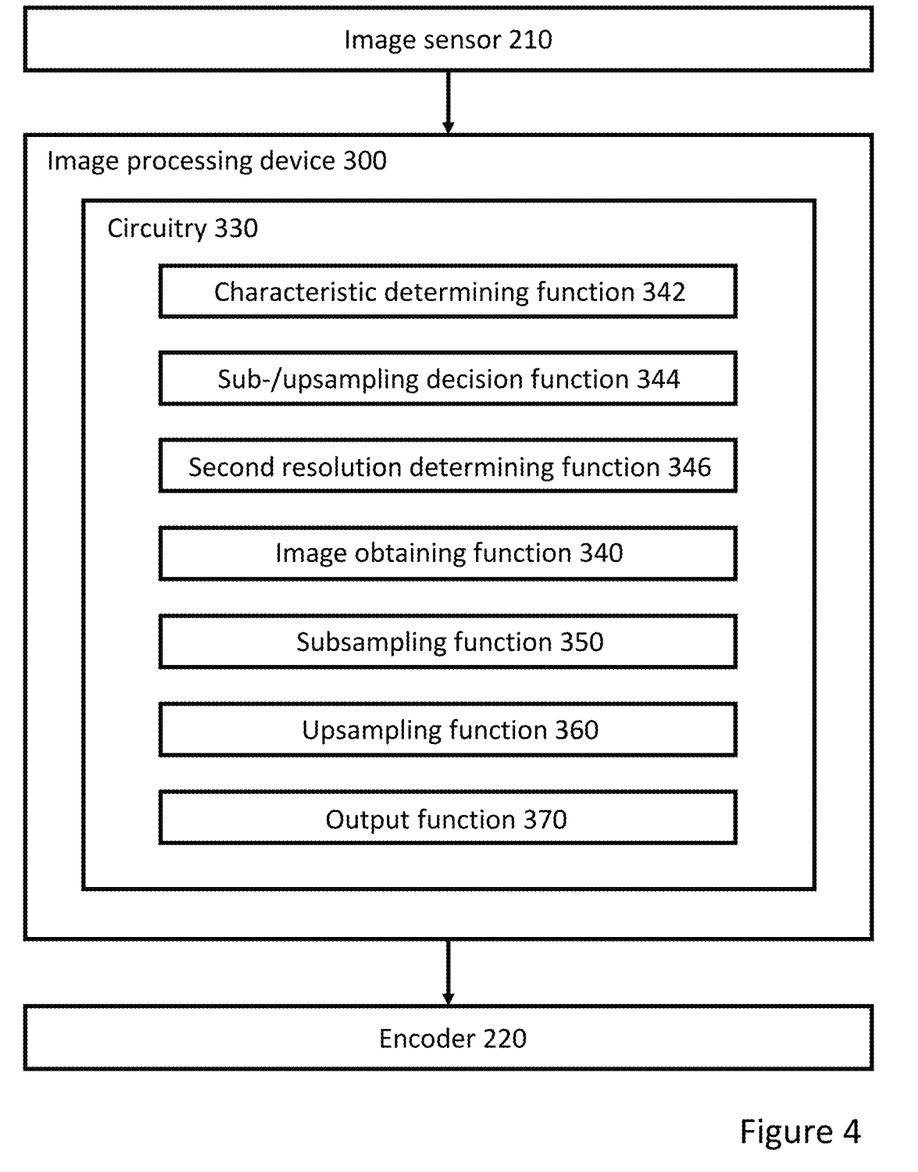
FIG. 4 is a schematic block diagram of a second embodiment of an image processing device according to the present disclosure in relation to an image sensor and an encoder.

FIG. 4 is a schematic block diagram of a second embodiment of an image processing device 300 according to the present disclosure in relation to an image sensor 210 and an encoder 220. Images of a video stream are received provided from the image sensor 210 to the image processing device 300 and then provided to the encoder 220. The image processing device 300 comprises circuitry 330 configured to execute an image obtaining function 340, a subsampling function 350, an upsampling function 360, and an output function 370 as described in relation to FIG. 3. Furthermore, the circuitry 330 is configured to execute a characteristic determining function 342, a sub-/upsampling decision function 344, a second resolution determining function 346. The characteristic determining function 342 is configured to determine a characteristic of the video stream. The second resolution determining function 346 is configured to determine the second resolution based on the determined characteristic of the video stream. The characteristic of the video stream may be one of a motion level, a light level, a noise level, and a bitrate. The sub-/upsampling decision function 344 is configured do decide whether or not to apply preprocessing by means of the subsampling function 350 and the upsampling function 360.

The circuitry 330 is configured to carry out the functions 340, 342, 344, 346, 350, 360, 370 of the image processing device 300. The circuitry 330 may include a processor (not shown), such as a central processing unit (CPU), microcontroller, or microprocessor. Such a processor (not shown) may be configured to execute program code. The program code may for example be configured to carry out the functions 340, 342, 344, 346, 350, 360, 370 of the image processing device 300.

The functions 340, 342, 344, 346, 350, 360, 370 of the image processing device 300 may be embodied in the form of executable logic routines (e.g., lines of code, software programs, etc.) that are stored on a non-transitory computer readable medium (not shown) of the image process device 300 and are executed by the circuitry 330, e.g., using a processor (not show) in the circuitry 330. Furthermore, the functions 340, 342, 344, 346, 350, 360, 370 of the image processing device 300 may be a stand-alone software application or form a part of a software application. The described functions may be considered a method that a processing unit, e.g. the processor (not shown) of the circuitry 330 is configured to carry out. Also, while the described functions 340, 342, 344, 346, 350, 360, 370 may be implemented in software, such functionality may as well be carried out via dedicated hardware or firmware, or some combination of hardware, firmware and/or software.

When included in another device, such as a camera as shown in FIG. 2, the circuitry 330 of the image processing device 300 may be a separate circuitry or it may be included in the camera circuitry 230.

The functions carried out by the circuitry 330 may be further adapted as the corresponding steps of the method 100 described in relation to FIG. 1.

Figure 5:
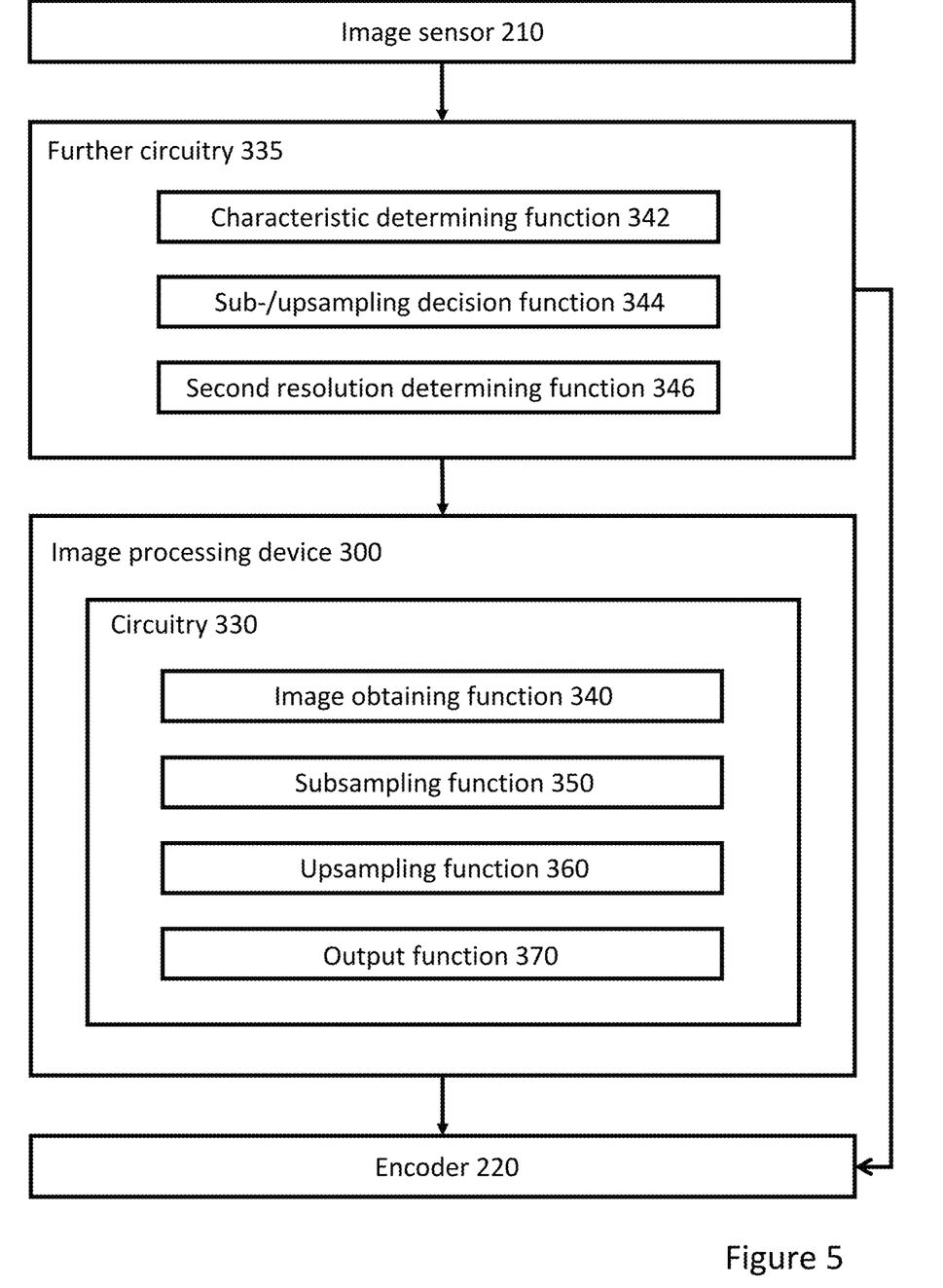
FIG. 5 is a schematic block diagram of a third embodiment of an image processing device according to the present disclosure in relation to an image sensor, an encoder and a further circuit.

FIG. 5 is a schematic block diagram of a third embodiment of an image processing device 300 according to the present disclosure in relation to an image sensor 210, an encoder 220 and a further circuitry 335. Images of a video stream are received provided from the image sensor 210 to the further circuitry 335 which in turn either provides the images directly to the encoder 220 or via the image processing device 300.

The image processing device 300 comprises circuitry 330 configured to execute an image obtaining function 340, a subsampling function 350, an upsampling function 360, and an output function 370 as described in relation to FIG. 3.

The circuitry 330 is embodied in hardware configured to carry out the functions 340, 350, 360, 370 of the image processing device 300.

The further circuit 335, such as the camera circuitry 230 of the camera of FIG. 2, is configured to execute a characteristic determining function 342, a sub-/upsampling decision function 344, a second resolution determining function 346. The characteristic determining function 342 is configured to determine a characteristic of the video stream. The second resolution determining function 346 is configured to determine the second resolution based on the determined characteristic of the video stream. The characteristic of the video stream may be one of a motion level, a light level, a noise level, and a bitrate. The sub-/upsampling decision function 344 is configured do decide whether or not to apply pre-processing by means of the subsampling function 350 and the upsampling function 360.

The further circuitry 335 is configured to carry out the functions 342, 344, 346. The circuitry 335 may include a processor (not shown), such as a central processing unit (CPU), microcontroller, or microprocessor. Such a processor (not shown) may be configured to execute program code. The program code may for example be configured to carry out the functions 342, 344, 346.

The functions, 342, 344, 346 may be embodied in the form of executable logic routines (e.g., lines of code, software programs, etc.) that are stored on a non-transitory computer readable medium (not shown) of the image process device 300 and are executed by the circuitry 330, e.g., using a processor (not show) in the circuitry 330. Furthermore, the functions 342, 344, 346 may be a stand-alone software application or form a part of a software application. The described functions may be considered a method that a processing unit, e.g. the processor (not shown) of the circuitry 330 is configured to carry out. Also, while the described functions 342, 344, 346 may be implemented in software, such functionality may as well be carried out via dedicated hardware or firmware, or some combination of hardware, firmware and/or software.

The functions carried out by the circuitry 330 and the further circuitry 335 may be further adapted as the corresponding steps of the method 100 described in relation to FIG. 1.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method of pre-processing images of a video stream before encoding the video stream, the method comprising:
at predetermined intervals, obtaining images of the video stream, wherein the obtained images have a first resolution;
at the predetermined intervals, determining a bitrate of the video stream as encoded for a current interval, wherein the bitrate is determined for images of the video stream obtained in a previous interval;
at the predetermined intervals, determining a second resolution for the current interval based on the determined bitrate of the video stream as encoded for the current interval, wherein if the determined bitrate of the video stream as encoded for the current interval has increased compared to a previous interval, the second resolution is decreased for the current interval, and if the determined bitrate of the video stream as encoded for the current interval has decreased compared to a previous interval, the second resolution is increased for the current interval;
during the predetermined intervals, sub sampling the obtained images to intermediate images having the second resolution for the current interval lower than the first resolution and lower than a third resolution; and
during the predetermined intervals, upsampling the intermediate images to output images having the third resolution, wherein the third resolution is the same for all images of the video stream.

2. The method of claim 1, wherein the subsampling comprises applying a subsampling algorithm, and/or the upsampling comprises applying an upsampling algorithm configured to increase correlation between pixels of the output images in relation to the correlation between pixels of the obtained images.

3. The method of claim 2, wherein the subsampling algorithm is based on interpolation between the pixels of the obtained images, and the upsampling algorithm is based on interpolation between the pixels of the intermediate images.

4. The method of claim 3, wherein the interpolation between the pixels of the obtained images is one of bilinear interpolation, area interpolation, bicublin interpolation, bicubic interpolation, spline interpolation, lanczos interpolation, and sinc interpolation, and the interpolation between the pixels of the intermediate images is one of bilinear interpolation, area interpolation, bicublin interpolation, bicubic interpolation, spline interpolation, lanczos interpolation, and sinc interpolation.

5. The method of claim 1, wherein the method further comprises:
during the predetermined intervals, encoding the output images by an encoder.

6. The method of claim 5, wherein the upsampling comprises partitioning pixels of the output images into a predetermined block size, wherein the predetermined block size is determined based on a block size supported by the encoder.

7. A non-transitory computer readable storage medium having stored thereon instructions that when executed by a device having processing capabilities, cause the device having processing capabilities to perform a method, the method comprising:
- at predetermined intervals, obtaining images of the video stream, wherein the obtained images have a first resolution;
- at the predetermined intervals, determining a bitrate of the video stream as encoded for a current interval, wherein the bitrate is determined for images characteristic indicates a bitrate of the video stream obtained in a previous interval;
- at the predetermined intervals, determining a second resolution for the current interval based on the determined bitrate of the video stream as encoded for the current interval, wherein if the determined bitrate of the video stream as encoded for the current interval has increased compared to a previous interval, the second resolution is decreased for the current interval, and if the determined bitrate of the video stream as encoded for the current interval has decreased compared to a previous interval, the second resolution is increased for the current interval;
- during the predetermined intervals, subsampling the obtained images to intermediate images having the second resolution for the current interval lower than the first resolution and lower than a third resolution; and
- during the predetermined intervals, upsampling the intermediate images to output images having the third resolution, wherein the third resolution is the same for all images of the video stream.

8. An image processing device comprising:
circuitry configured to
- at predetermined intervals, obtain images of a video stream before encoding the video stream, wherein the obtained images have a first resolution;
- at the predetermined intervals, determine a bitrate of the video stream as encoded for a current interval, wherein the bitrate is determined for images of the video stream obtained in a previous interval;
- at the predetermined intervals, determine a second resolution for the current interval based on the determined bitrate of the video stream as encoded for the current interval, wherein if the determined bitrate of the video stream as encoded for the current interval has increased compared to a previous interval, the second resolution is decreased for the current interval, and if the determined bitrate of the video stream as encoded for the current interval has decreased compared to a previous interval, the second resolution is increased for the current interval;
- during the predetermined intervals, subsample the obtained images to intermediate images having the second resolution for the current interval lower than the first resolution and lower than a third resolution;
- during the predetermined intervals, upsample the intermediate images to output images having the third resolution, wherein the third resolution is the same for all images of the video stream, and
- during the predetermined intervals, output the output images to an encoder configured to encode the output images into an encoded video stream.

9. The image processing device of claim 8, wherein the circuitry is further configured to apply a subsampling algorithm, and/or the circuitry is further configured to apply an upsampling algorithm configured to increase correlation between pixels of the output images in relation to the correlation between pixels of the obtained images.

10. The image processing device of claim 9, wherein the subsampling algorithm is based on interpolation between the pixels of the obtained images, and the upsampling algorithm is based on interpolation between the pixels of the intermediate images.

11. The image processing device of claim 10, wherein the interpolation between the pixels of the obtained images is one of bilinear interpolation, area interpolation, bicublin interpolation, bicubic interpolation, spline interpolation, lanczos interpolation, and sine interpolation, and the interpolation between the pixels of the intermediate images is one of bilinear interpolation, area interpolation, bicublin interpolation, bicubic interpolation, spline interpolation, lanczos interpolation, and sine interpolation.

12. A monitoring camera comprising the image processing device of claim 8.

13. A monitoring camera comprising the image processing device of claim 9.

14. A monitoring camera comprising the image processing device of claim 10.

15. A monitoring camera comprising the image processing device of claim 11.

* * * * *